March 12, 1935.  H. PERSSON  1,994,420
TILE CUTTER
Filed May 25, 1934
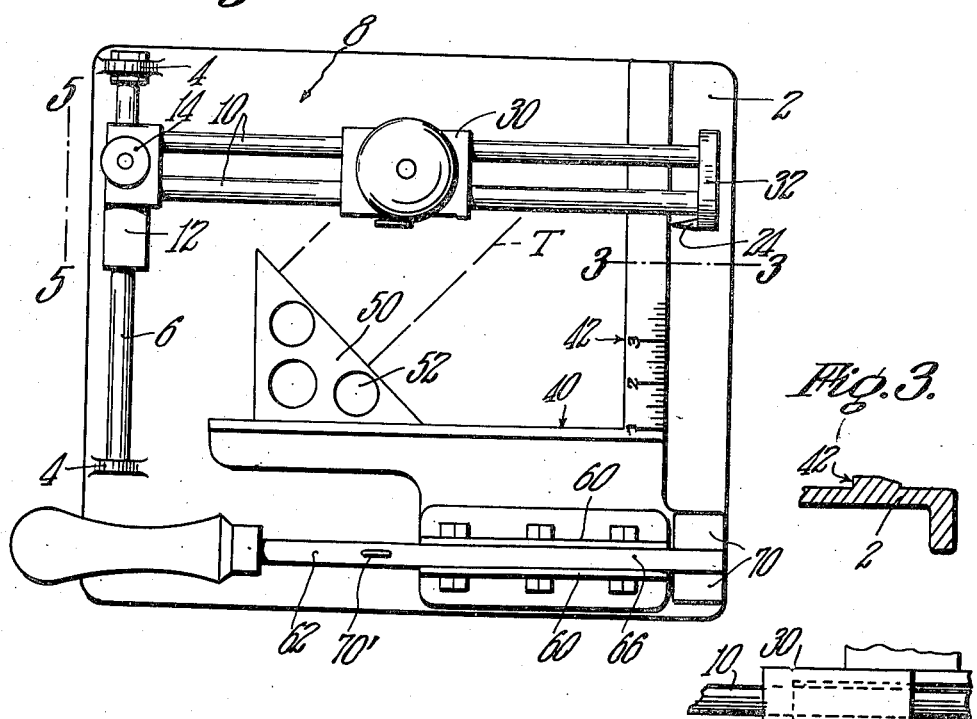
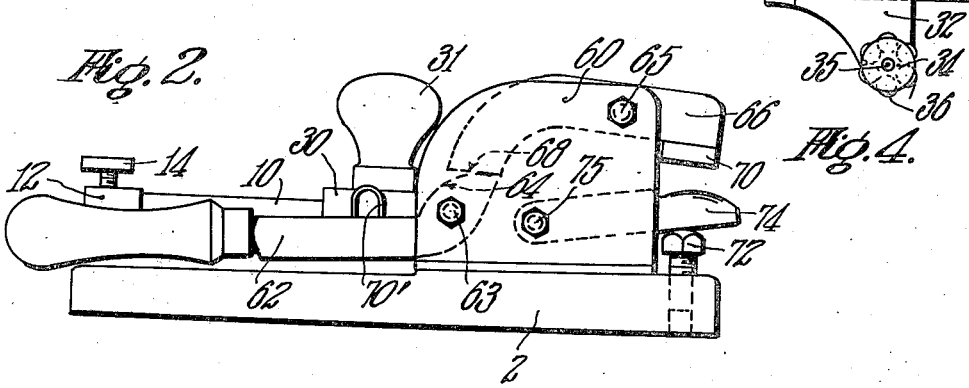
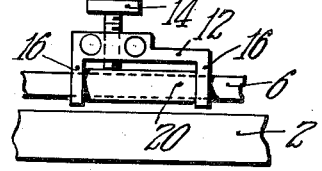
INVENTOR.
Henry Persson.
BY
ATTORNEY.

Patented Mar. 12, 1935

1,994,420

UNITED STATES PATENT OFFICE 1,994,420

TILE CUTTER

Henry Persson, Maplewood, N. J., assignor to Landon P. Smith, Inc., Irvington, N. J., a corporation of New Jersey Application May 25, 1934, Serial No. 727,397

3 Claims. (Cl. 125—23)

This invention relates to improvements in apparatus for cutting tile, glass and the like and is directed more particularly to improvements in apparatus which may be adjusted to accurately and readily cut tile, glass and the like of various thicknesses to the desired size and shape.

The principal objects of the invention are directed to the provision of a novel compact and easily handled device which has a slidable cutter member thereon which may be set to mark cutting lines on the material to provide pieces of desired size and shape and is provided with novel means for guiding and supporting the material for the marking operation.

A further object of the invention is the provision of apparatus of the class described having novel means associated therewith for separating the material along the cutting line and which may also be adjusted to accommodate material of different sizes.

Various other novel features and advantages of the invention will hereinafter appear in the accompanying description in which reference will be had to the accompanying drawing, wherein:

Fig. 1 is a plan view of the apparatus of the invention,

Fig. 2 is a side elevational view of the apparatus shown in Fig. 1,

Fig. 3 is a sectional view on the line 3—3 of Fig. 1,

Fig. 4 is a partial side elevational view of the marking mechanism of the apparatus, and Fig. 5 is a partial side elevational view of the adjustable guiding member of the apparatus.

Referring now to the drawing in detail, the invention will be more fully described.

At 2 is represented a supporting base plate member which preferably has a substantially flat upper surface and it may be of metal, wood or other relatively rigid material. Extending upwardly from the base plate 2 are spaced bracket members 4 and these support a guide in the form of a rod 6 which slidably carries a carrier member indicated generally by 8.

The carrier 8 may consist of a bracket 12 having downwardly depending legs 16 slidable and oscillatable on the rod 6. A pair of rod members 10 extend from the member 12 at substantially right angles to the guide 6 and, of course, are fixed thereto so as to be movable therewith.

An opening is preferably provided in the upper side of the member 12 for receiving a screw threaded clamp bolt 14 which may be moved into and out of contact with the rod member 6 so as to rigidly hold the carrier 8 in its adjusted position relative to the plate 2. A tubular member 20 may be provided around the rod 6 between the lugs 16. Thus, the screw 14 may be tightened to bear against the tube 20 and in this way injury to the rod is prevented. While the tube and member 12 are clamped to the guide, the member 12 may oscillate on the guide however when clamped as set forth.

The outer ends of the rods 10 are connected to a head or index member 32 which has an index pointer 24 associated therewith for purposes which will shortly appear.

A cutter slide 30 is slidable on the rods 10 and this has a downwardly extending portion 32 which carries a disc 34 rotatable on a clamp screw 35 and is provided with a plurality of rotatable cutter or marking wheels 36 as shown in Fig. 4. Of course, a single wheel such as 36 may be used if desired.

A hand grip 31 may be associated with the slide 30 whereby it may be moved back and forth on the rods 10.

It may be seen that not only is the cutter slide 30 movable back and forth on the carrier so as to move the marking mechanism transversely of the base plate 2 but the carrier 8 is adjustable back and forth on the guide 6 so that the marking mechanism may be moved longitudinally of the base plate.

According to the preferred form of the invention, straight edges such as 40 and 42 are provided on the upper surface of the base plate and these are preferably disposed at right angles to one another substantially as shown in Fig. 1. One or both of the straight edges may be provided with measuring indices as shown in connection with the member 42. The index pointer 24 of the member 32 is adapted to indicate the width of the pieces to be cut so that the carrier may be adjusted accordingly.

A positioning member such as 50 is provided to be movable across the upper surface of the plate 2 and this preferably has at least one straight edge to co-operate with one of the straight edges, 40 or 42, and another edge at an angle thereto as shown. In this way, the material to be marked may be positioned to have one edge adjacent the positioning member and thus the material may be disposed at an angle relative to the cutter slide 30.

As stated, the member 50 is movable across the upper surface of the supporting base plate 2 and it is substantially flat so as to lie contiguous thereto throughout its area. Apertures such as 52 may be provided in the positioning member for receiving the fingers of the hand so that it may be readily moved over the surface of the plate or, of course, an upstanding grip member of some sort may be provided.

In the operation of the device, the carrier 8 may be oscillated on the rod 6 and moved upwardly so that tile or the like may be placed under the cutter slide 30. The carrier may be adjusted relative to the guide 6 and straight edges and then the slide 30 may be grasped and moved over the tile to mark the cutting line. The tile is then ready to be separated along the cutting line.

Spaced bracket members 60 extend upwardly from the supporting plate 2 and they have a lever member 62 pivoted therebetween as at 63. The inner end of the lever 62 is provided with a cam face 64 as shown. A jaw member 66 is also pivoted between the bracket members 60 as at 65. This has on its inner end a cam face 68 for co-operating with the cam face 64 of the lever and on its outer end a jaw plate 70.

An adjustable supporting post 72 extends upwardly from the base plate 2 adjacent bracket members 60 beneath the jaw plate 70. The post 72 is preferably screw-threaded in the base but in any event it is adjustable up and down relative to the jaw plate. An anvil member 74 has an inner end pivoted at 75 between the bracket members 60 and its outer end normally rests on the upper end of the supporting post 72 as shown in Fig. 2. Thus, it may be seen, by moving the supporting post 72 up and down the anvil member 74 may be adjusted relative to the jaw plate 70. That is to say, the distance between the anvil and plate may be increased or decreased as may be desired to accommodate the thickness of the tile to be broken. It is desirable that the plate 70 and anvil 74 be provided with bearing portions on their adjacent sides to bear against the material adjacent the cutting line.

In the operation of the braking mechanism, a marginal edge portion of the material to be cut is placed between the jaw plate 70 and the anvil 74 when the lever 62 is moved upwardly on its pivot 63 from the position shown in Fig. 2. The lever 62 is then moved sufficiently to cause its cam face 64 to bear upwardly against the cam face 68 of the jaw member 66 and move the jaw on its pivot 65 so that its plate 70 is urged downwardly towards the anvil 74. As stated, the post 72 is adjustable up and down to move the anvil 74 relative to the plate 70. When properly adjusted for the material of a certain thickness the member 70 as it descends bears on the material between it and the anvil to cause it to part on the cutting line.

A stop member such as 70' is provided on the upper side of the lever 62 to abut the rear side of the jaw 66 and limit the forward movement of the lever. The stop also serves as a means for urging the inner end of the jaw downwardly to open the jaw after the breaking operation.

While I have described my invention in great detail and wth respect to a preferred embodiment thereof, I do not desire to be limited to such detail or embodiment since many changes and modifications may be made without departing from the spirit and scope of the invention in its broader aspects. Hence, what I desire to claim as new and secure by Letters Patent of the United States is:

1. An apparatus for working upon tile or the like comprising in combination, a supporting plate, spaced brackets extending upwardly from and rigidly secured to said plate, an anvil member having an inner end portion pivoted between said brackets and an outer end portion extending forwardly thereof, a supporting post extending upwardly from said plate beneath said outer end portion of the anvil member and adjustable up and down relative thereto, a jaw member having an inner end portion pivoted between said brackets and an outer end portion extending forwardly thereof above said anvil member, the inner end of said jaw member being provided with a cam face, and a lever member pivoted between said brackets having a cam face for co-operating with said cam face of the jaw member, all adapted and arranged whereby a downward movement of said lever causes said outer end portion of the jaw member to move downwardly towards said anvil.

2. An apparatus for working upon tile or the like comprising in combination, a supporting plate, spaced brackets extending upwardly from and rigidly secured to said plate, an anvil member having an inner end portion pivoted between said brackets and an outer end portion extending forwardly thereof, a supporting post extending upwardly from said plate beneath said outer end portion of the anvil member and adjustable up and down relative thereto, a jaw member having an inner end portion pivoted between said brackets and an outer end portion extending forwardly thereof above said anvil member, the inner end of said jaw member being provided with a cam face, a normally horizontally-extending lever member pivoted between said brackets and movable into a substantially vertical position having a cam face for co-operating with said cam face of the jaw member, and a stop member on the upper side of said lever member for engaging said jaw member when said lever is in said vertical position to limit the movement thereof in one direction, all adapted and arranged whereby said lever may be moved downwardly so that its cam face acts upon said cam face of the jaw member to move the outer end portion of the latter downwardly towards said anvil.

3. An apparatus for working upon tile or the like comprising in combination, a supporting plate, a cutting device for scoring tile associated with the upper side of said plate, spaced brackets extending upwardly from and rigidly secured to said plate at a distance from said cutting device, an anvil member having an inner end portion pivoted between said brackets and an outer end portion extending forwardly thereof, a supporting post extending upwardly from said plate beneath said outer portion end of the anvil member and adjustable up and down relative thereto, a jaw member having an inner end portion pivoted between said brackets and an outer end portion extending forwardly thereof above said anvil member, the inner end of said jaw member being provided with a cam face, and a lever member pivoted between said brackets and movable between a horizontal and a substantially vertical position having a cam face for co-operating with said cam face of the jaw member, all adapted and arranged whereby a scored line may be made on a piece of tile by said cutting device and said piece of tile may be placed between said anvil member and jaw member with said lever in its vertical position and said lever may be moved towards its horizontal position to urge said jaw member downwardly towards said anvil and break said piece of tile along said scored line.

HENRY PERSSON.